US006563806B1

(12) United States Patent
Yano et al.

(10) Patent No.: US 6,563,806 B1
(45) Date of Patent: May 13, 2003

(54) BASE STATION FOR MULTI-CARRIER TDMA MOBILE COMMUNICATION SYSTEM AND METHOD FOR ASSIGNING COMMUNICATION CHANNELS

(75) Inventors: Masashi Yano, Fujisawa (JP); Susumu Matsui, Machida (JP); Yoshinobu Yamamoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/209,463

(22) Filed: Dec. 11, 1998

(30) Foreign Application Priority Data

Dec. 12, 1997 (JP) ............................................. 9-343171

(51) Int. Cl.⁷ ............................. H04Q 7/00; H04Q 7/02
(52) U.S. Cl. ........................ 370/330; 370/348; 455/452
(58) Field of Search ................................. 370/329–330, 370/332, 336, 337, 341, 347, 348, 442, 443, 280, 294, 436; 455/509, 513, 450, 451, 452

(56) References Cited

U.S. PATENT DOCUMENTS

| 5,203,008 A | * | 4/1993 | Yasuda et al. | ............... | 455/452 |
| 5,280,630 A | * | 1/1994 | Wang | ......................... | 455/452 |
| 5,363,428 A | * | 11/1994 | Nagashima | ................ | 455/452 |
| 5,446,739 A | * | 8/1995 | Nakano et al. | ............. | 370/337 |
| 5,778,319 A | * | 7/1998 | Sawaki | ........................ | 370/337 |
| 5,956,642 A | * | 9/1999 | Larsson et al. | ............. | 455/452 |
| 6,018,528 A | * | 1/2000 | Gitlin et al. | ................ | 370/436 |

* cited by examiner

Primary Examiner—Steven Nguyen
(74) Attorney, Agent, or Firm—Antonelli, Terry, Stout & Kraus, LLP

(57) ABSTRACT

A base station for a multi-carrier TDMA radio communication system comprises a first management table for registering at least one candidate channel for single-channel communication selected from among multiple traffic channels each defined in terms of the carrier frequency and time slot number, a second management table for registering at least one group of candidate channels for multi-channel communication selected from among the multiple traffic channels, and a channel assigning unit which, in response to the reception of a channel assignment request from a mobile station, assigns at least one traffic channel to the requesting mobile station by making reference to one of the first and second management tables depending on the type of the mobile station.

12 Claims, 13 Drawing Sheets

FIG. 4

| CARRIER FREQUENCY | TS1 | TS2 | TS3 | TS4 | |
|---|---|---|---|---|---|
| $f_1$ | 1 | n+1 | 2n+1 | 3n+1 | ~200-1 |
| $f_2$ | 2 | n+2 | 2n+2 | 3n+2 | ~200-2 |
| $f_3$ | 3 | n+3 | 2n+3 | 3n+3 | ~200-3 |
| ⋮ | | | | | |
| $f_{n-1}$ | n−1 | 2n−1 | 3n−1 | 4n−1 | |
| $f_n$ | n | 2n | 3n | 4n | ~200-n |

| TIME SLOT | TS1 | TS2 | TS3 | TS4 |
|---|---|---|---|---|
| CANDIDATE CHANNEL | 23 | 47 | 83 | 12 |

| GROUP NO. | g1 | g2 | g3 |
|---|---|---|---|
| FIRST CHANNEL CH1 | 29 | 49 | 5 |
| SECOND CHANNEL CH2 FOR THE SAME CARRIER | 45 | 64 | — |
| SECOND CHANNEL CH3 FOR DISCONTINUOUS TIME SLOT | 62 | 4 | 34 |
| SECOND CHANNEL CH4 FOR ARBITRARY CARRIER / TIME SLOT | 72 | 33 | 65 |

400-1  400-2  400-3

BASE STATION FOR MULTI-CARRIER TDMA MOBILE COMMUNICATION SYSTEM AND METHOD FOR ASSIGNING COMMUNICATION CHANNELS

BACKGROUND OF THE INVENTION

1. Field of the Invention

The present invention relates to a radio base station which communicates with multiple mobile stations through radio traffic channels, and more particularly to a multi-carrier TDMA radio base station and a method of traffic channel assignment in which multiple carrier frequencies and multiple time slots which are formed at each carrier frequency on a time-division basis are combined selectively thereby to establish multiple radio traffic channels.

2. Description of the Prior Art

Among the digital cordless telephone systems, some systems adopt the multi-carrier TDMA system for the access scheme of radio channels. The multi-carrier TDMA is capable of providing a total of N-by-M channels by using, for each base station, multiple (N) carrier frequencies each having the formation of multiple (M) TDMA time slots.

As stated in the RCR STD-28 (A standard of Research and Development Center for Radio System), each mobile station of a digital cordless telephone system is rendered the assignment a traffic channel (information channel) by the base station through the control channel at the commencement of communication or at the handover which occurs when the mobile station moves from one cell area to another cell area, and it carries out communication by using the assigned traffic channel.

Each base station of the multi-carrier TDMA telephone system responds to a request of traffic channel assignment from a mobile station to select a channel that meets the specified communication quality, e.g., CIR (carrier to interference power ratio) above a certain threshold, from among the multiple (N-by-M) channels, and assigns the selected channel to the mobile station.

There are two known schemes of channel selection. The FA (first available) scheme selects at random a combination of a carrier frequency and a time slot position which determines the starting channel for the quality check, measures the communication quality of the channel while shifting the combination sequentially, and assigns the first found channel that meets the specified quality to the mobile station. The worst CIR scheme measures the quality of all N-by-M channels, and assigns the channel of the worst quality out of the channels which meet the specified quality to the mobile station. The worst CIR scheme is advantageous in the efficiency of use of frequencies, while it suffers from a longer time expended for channel assignment.

With the intention of overcoming the drawback of the worst CIR scheme, there is proposed a channel assignment scheme in Japanese Patent Unexamined Publication No. Hei 6-209283, for example, in which one time slot is selected out of multiple time slots, the communication quality is measured for channels of N in number having the selected time slot and different carrier frequencies, and the carrier of the lowest quality among the carriers that meet the specified quality is selected for assignment to the mobile station. This modified worst CIR scheme is designed to assign a channel to a mobile station based on the FA scheme by varying the time slot position if no carrier that meets the specified communication quality is found for the first-selected time slot.

In regard to the radio communication system of multi-carrier TDMA, a high-speed data communication service which needs to assign multiple traffic channels to one mobile station is under study. In this case, however, due to the limited communication functions installed on mobile stations, restriction is imposed on a set of multiple traffic channels assigned to one mobile station, e.g., channels may have a same carrier frequency and different time slots, or channels may have different carrier frequencies and discontinuous time slots.

In this respect, in the conventional channel assignment schemes which assign traffic channels at random to requesting mobile stations, unused channels are left cumulatively in the form of irregular channel setup which represents the combinations of carrier frequencies and time slots, resulting highly possibly in a call blocking caused by the failure of channel assignment for a request of simultaneous multi-channel assignment from a mobile station due to the absence of remaining channels that meet the required condition of the mobile station.

Moreover, the conventional channel assignment schemes are designed to commence the channel selecting operation upon receiving a channel assignment request, resulting adversely in a longer time expended for channel assignment for a multi-channel assignment request, with the above-mentioned special restriction being imposed.

SUMMARY OF THE INVENTION

An object of the present invention is to provide a method of traffic channel assignment and a base station which are capable of responding quickly to a request of multi-channel assignment from a mobile station.

Another object of the present invention is to provide a method of traffic channel assignment and a base station which are capable of reducing the occurrence of call blocking for a request of multi-channel assignment from a mobile station.

In order to achieve the above objectives, the base station of multi-carrier TDMA radio communication system based on this invention comprises a management table memory for registering at least one group of candidate channels for multi-channel communication selected from among multiple traffic channels defined in terms of the carrier frequency and time slot number, and a channel assigning unit which, in response to the reception of a channel assignment request from a mobile station of multi-channel type that uses multiple channels, assigns traffic channels to the mobile station by making reference to the management table memory.

More specifically, the candidate channel group for multi-channel communication registered in the management table memory comprises multiple candidate channels having a certain mutual relation in regard to the channel arrangement in terms of the carrier frequency and time slot number, and the channel assigning unit selects channels that are suited for the requesting mobile station from among the multiple candidate channels included in the candidate channel group.

A feature of the present invention is that the channel assignment unit includes a means of measuring the communication quality of a candidate channel, which has been selected with reference to the management table memory, in cooperation with the requesting mobile station, and a means which, if candidate channels of the specified communication quality to be assigned to the mobile station are absent in the management table memory, searches for free channels of the specified communication quality to be assigned to the mobile station from among other traffic channels which are not registered in the management table memory.

According to a preferred embodiment of this invention, the base station of a multi-carrier TDMA radio communication system comprises a first management table for registering at least one candidate channel for single-channel communication selected from among multiple traffic channels defined in terms of the carrier frequency and time slot number, a second management table for registering at least one group of candidate channels for multi-channel communication selected from among the multiple traffic channels, and a channel assignment unit which, in response to the reception of a channel assignment request from a mobile station, assigns a traffic channel to the mobile station by making reference to one of the first and second management tables selectively depending on the type of the requesting mobile station.

Reference is made to the first management table in case the requesting mobile station is of single-channel type, or to the second management table in case it is of multi-channel type.

The first and second management tables have their contents updated at the commencement or termination of communication by a mobile station, or updated when the channel is switched, or updated periodically. The updating process of the second management table for multi-channel communication takes precedence over the first table for single-channel communication, and multiple groups of free channels selected in the specified order from among multiple channels formed by multi-carrier TDMA are registered in it.

As to whether a channel is available or not can be discriminated based on the received RF signal level. According to one embodiment of this invention, the candidate channel which has been checked to be a free channel based on the received RF signal level is examined as to whether it is an effective candidate channel by implementation of communication with at least one mobile station.

In case a mobile station of multi-channel type which was assigned a first channel for multi-channel communication has initiated the calling procedure without requesting a second channel, the second channel which is left in the second management table becomes idle. In this case, according to one embodiment of this invention, the base station reduces the transmission power of the first channel intentionally in order to let the mobile station request the channel switching, so that it assigns a traffic channel resulting from referencing to the first management table in response to the channel switching request. The first channel is freed by the channel switching, and it is registered as a candidate channel for multi-channel communication back in the second management table at the next management table updating process.

BRIEF DESCRIPTION OF THE DRAWINGS

FIG. 4 is a table showing an example of the channel arrangement of the multi-carrier TDMA;

FIG. 5 is a table showing the single-channel management table for registering candidate channels for single-channel communication;

FIG. 6 is a table showing the multi-channel management table for registering candidate channels for multi-channel communication;

DESCRIPTION OF THE PREFERRED EMBODIMENTS

Embodiments of the present invention will be explained with reference to the drawings.

Figure 1:
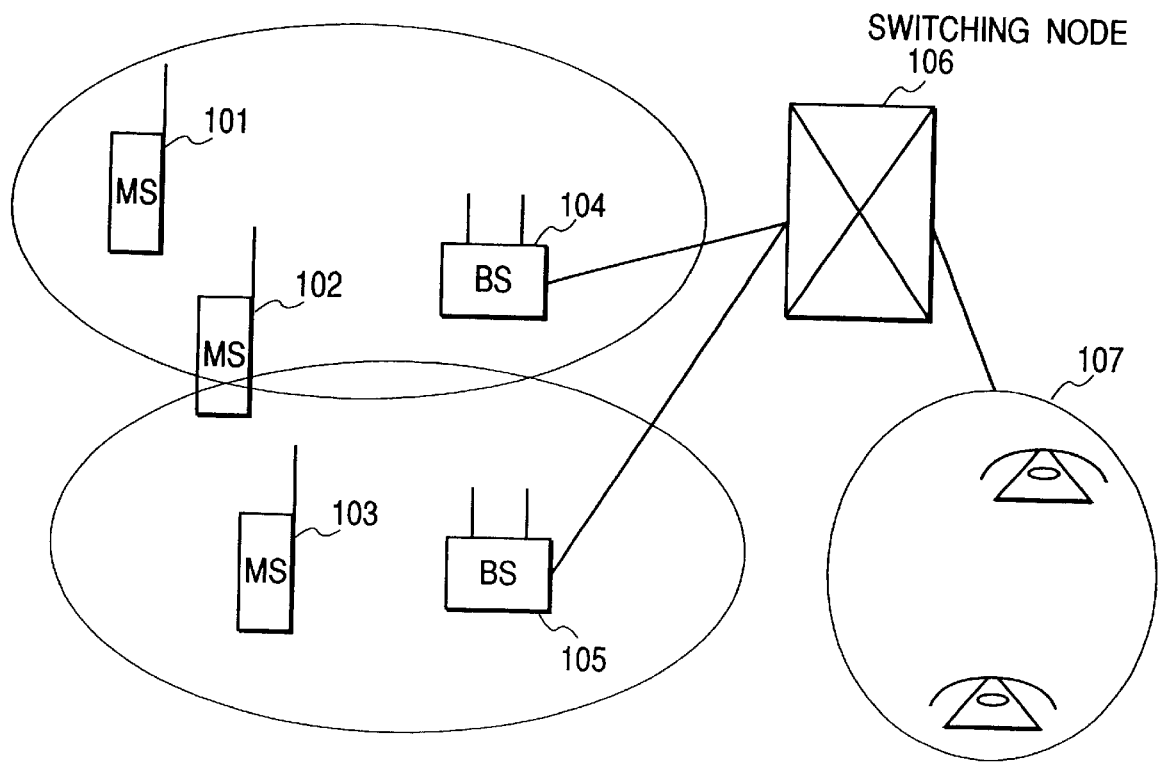
FIG. 1 is a diagram showing a digital cordless telephone system to which the present invention is applied.

FIG. 1 shows a digital cordless telephone system to which the present invention is applied. The system includes mobile stations (MS) 101,102 and 103, base stations (BS) 104 and 105, and a switching node 106 which is connected to the base stations. Indicated by 107 is other communication network connected with the switching node 106. The base stations 104 and 105 have individual communication areas which are determined by the strengths of their radiated output power. The mobile stations 101-103 located in these communication areas are connected to the switching node 106 by way of the respective base stations thereby to implement communication with other mobile stations or other stations in other communication network 107.

Figure 2:
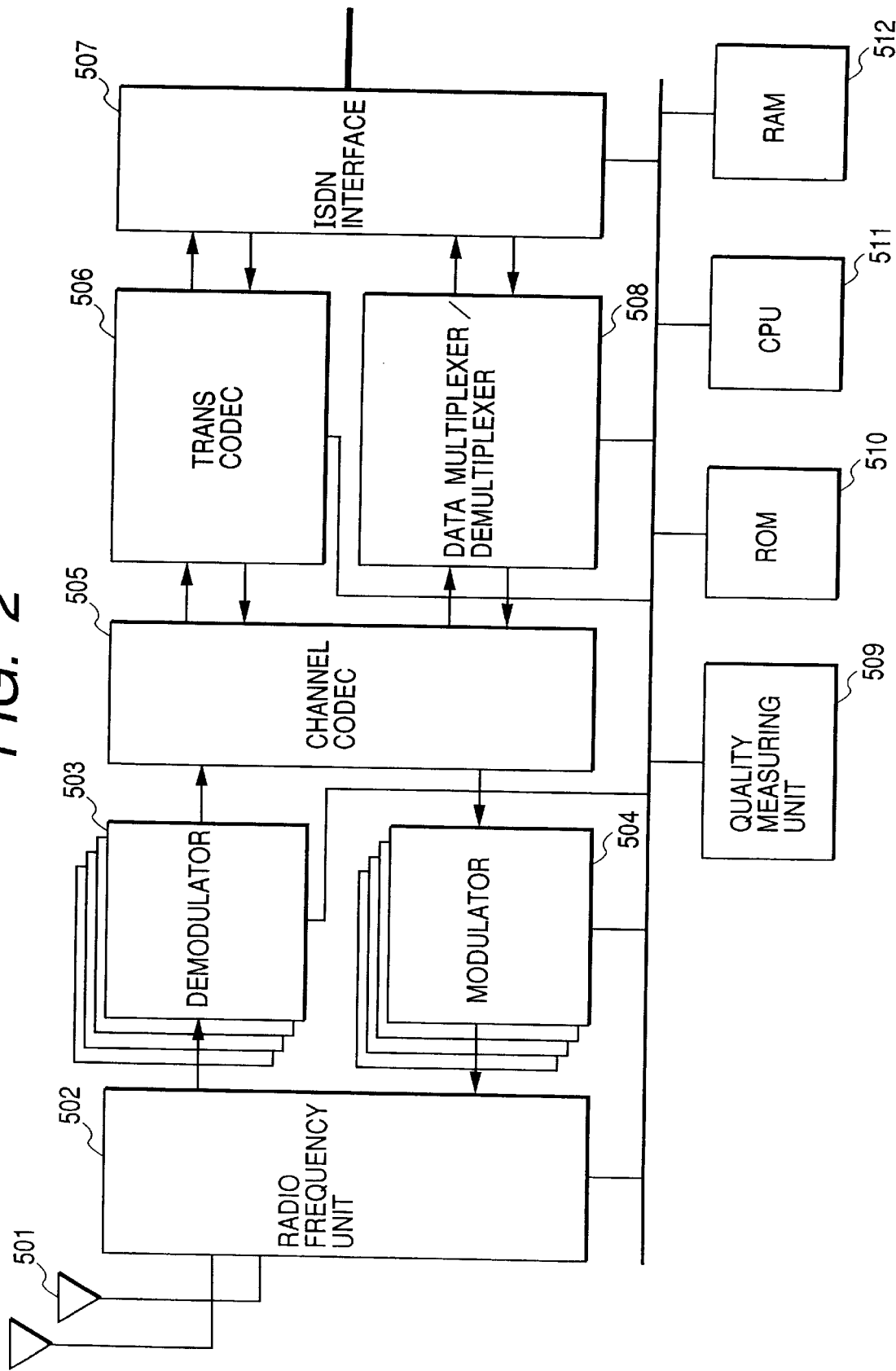
FIG. 2 is a block diagram of the base station.

FIG. 2 shows the arrangement of the base stations 104 and 105. The base station includes an antenna 501, a radio frequency (RF) unit 502 which transmits and receives radio signals through the antenna, demodulators 503 which are connected to the RF unit 502 and adapted to demodulate incoming signals of different carrier frequencies, modulators 504 which are connected to the RF unit 502 and adapted to modulate outgoing signals of different carrier frequencies, a channel codec 505 which is connected to the demodulators 503 and modulators 504, a trans codec 506 which is connected between the channel codec 505 and a cable network (digital network, ISDN) interface 507 and adapted to encode and decode audio communication data, and a data multiplexer/demultiplexer 508 which is connected between the channel codec 505 and ISDN interface 507 and adapted to convert the data bit rate for data communication. In data communication with a mobile station which uses multiple traffic channels simultaneously, the data multiplexer/demultiplexer 508 also works to multiplex and demultiplex data for these channels. The base station is connected to the switching node 106 through the ISDN interface 507.

The base station further includes a communication quality measuring unit 509, a memory (ROM) 510 which stores various programs, a processor (CPU) 511 which serves as channel assignment unit based on this invention, and a memory (RAM) 512 which stores various data tables which will be explained later. The processor 511, which is connected with the above-mentioned components in the base station, operates to execute the programs stored in the memory 510, thereby working for the base station and implementing the channel assignment based on this invention as will be explained in the following.

Figure 3:
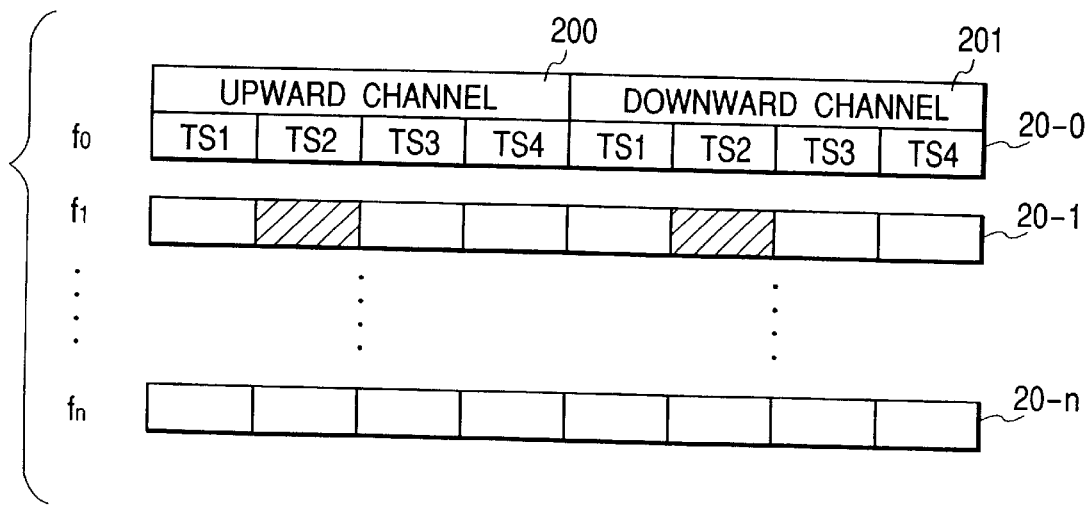
FIG. 3 is a diagram used to explain the relation between the carrier frequencies and time slots of the multi-carrier TDMA.

FIG. 3 shows the relation between the carrier frequencies and time slots of the multi-carrier TDMA.

In the multi-carrier TDMA, multiple carrier frequencies f0 and f1–fn are used to transmit a frame which includes multiple time slots having these carrier frequencies.

Transmission from mobile stations to base stations takes place in time slots TS1–TS4 that are defined to be an upward channel 200, while transmission from base stations to mobile stations takes place in time slots TS1–TS4 that are defined to be a downward channel 201. Among the carrier frequencies, f0 is used for the communication of control information, and f1–fn are used for the communication of user information. The assignment of traffic channel to each mobile station is such that time slots that correspond in position in the upward channel 200 and downward channel 201 are assigned to a mobile station, as shown by hatching in FIG. 3. The following explanation of channel assignment based on an embodiment of this invention will concentrate on the upward channel 200.

FIG. 4 shows the arrangement of traffic channels of the case of four time slots in one frame and carrier frequencies of n in number. In this example, a total of 4n traffic channels are set up. With the carrier frequencies being numbered by n (n=1 through n) and the time slots being numbered by s (s=1 through 4), the traffic channels are given channel numbers expressed by n+(s−1), although this expression will be substituted by CH(f, s) in the following explanation.

Prior to the channel assignment operation, each base station examines the situation of free traffic channels, and registers candidate channels for single-channel communication to be assigned to mobile stations each using one channel in each direction (will be termed "single-channel mobile stations") and candidate channels for multi-channel communication to be assigned to mobile stations each using multiple channels in each direction (will be termed "multi-channel mobile stations") in the first management table and second management table, respectively.

By collecting candidate channels for multi-channel communication in precedence over candidate channels for single-channel communication, candidate channels which meet the channel setup conditions demanded by multi-channel mobile stations can be preserved. Based on the selection of channels that meet the communication quality out of the candidate channels registered in the management tables, the channel assignment time can be reduced.

FIG. 5 shows an example of the single-channel management table 300 which registers candidate channels for single-channel communication. The single-channel management table 300 stores one candidate channel for each of the time slots TS1–TS4. At the reception of a channel assignment request from a single-channel mobile station, the base station searches through the candidate channels registered in the table 300 for a channel to be assigned to the requesting mobile station. Instead of one candidate channel registered for each time slot as explained above, multiple candidate channels may be registered for each time slot.

FIG. 6 shows an example of the multi-channel management table 400 which registers candidate channels for multi-channel communication. Multi-channel mobile stations are assumed to be of 2-channel type in this embodiment. The multi-channel management table 400 stores multiple groups of candidate channels 400-1,400-2 and 400-3 having group numbers g1, g2 and g3. Specifically, in this example, each group consists of candidate channel CH1 to be assigned as a first channel and candidate channels CH2, CH3 and CH4 to be assigned as a second channel to a 2-channel mobile station.

At the reception of an assignment request of a first channel from a 2-channel mobile station, the base station makes reference to the management table 400 and assigns a first candidate channel CH1 in a channel group, e.g., g1. On receiving an assignment request of a second channel from the same mobile station, the base station selects a candidate channel that matches with the communication function of the mobile station from among the second candidate channels CH2–CH4 in the channel group g1.

The candidate channel CH2 is formed of another free time slot in the frame of the same carrier frequency as of the first candidate channel CH1. The candidate channel CH3 is formed of a free time slot irrespective of the carrier frequency and having a discontinuous time-wise relation with the first candidate channel CH1. The candidate channel CH4 is formed of a free time slot in an arbitrary combination of a carrier frequency and time slot in the channel setup regardless of the first candidate channel CH1. Although the management table 400 contains only three groups (g1–g3) of candidate channels in this example, more number of candidate channel groups will be registered in practice.

The management tables 300 and 400 have their contents updated when the processor 511 runs the management table updating program, which will be explained in connection with FIG. 7 and FIG. 8, periodically or at the end of channel assignment to one mobile station. The management table updating program may also be run at the time when an assigned traffic channel is freed at the end of communication by one mobile station, at channel switching, or at handover.

Figure 7:
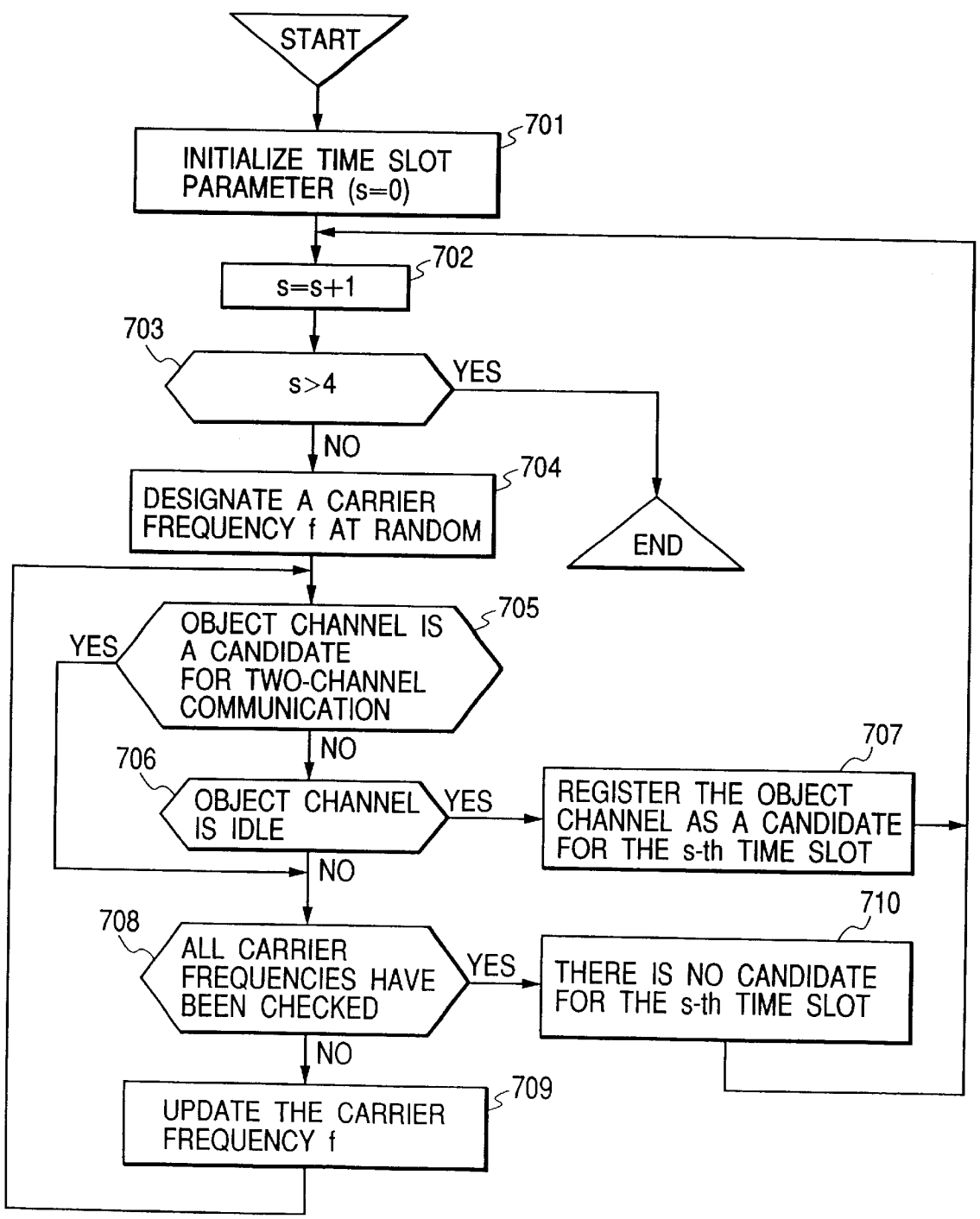
FIG. 7 is a flowchart showing the updating process for the single-channel management table.

FIG. 7 shows the programmed updating process for the single-channel management table 300. For finding sequentially candidate channels of the time slots TS1–TS4 in the single-channel management table 300, the first step 701 initializes the parameter s of time slot number to 0. Step 702 increments the parameter s by one.

Step 703 checks the resulting value of parameter s. If it exceeds the upper limit of 4, the process terminates. Otherwise, if the parameter s is 4 or smaller, step 704 designates at random a carrier frequency f which becomes the start point of search of the candidate channel. Step 705 checks as to whether the channel CH(f, s) which is the object of examination is already registered as a candidate channel for multi-channel communication in the multi-channel management table 400. Unless the object channel CH(f, s) is already registered as a candidate channel, step 706 checks as to whether the object channel is a free channel of the specified communication quality. Specifically, the quality measuring unit 509 introduces the incoming signal provided by the demodulator 503 of the carrier frequency f, and determines the channel to be a free channel of the specified quality if the signal level inclusive of the interfering signal is below the prescribed level.

When the object channel CH(f, s) is found to be a free channel of the specified quality, step 707 registers its identifier (or channel number) as candidate channel of time slot s in the management table 300. Then, the process returns to step 702.

If the object channel CH(f, s) is not a free channel of the specified quality, or if it is already registered as a candidate channel for multi-channel communication, step 708 checks as to whether channels of all carrier frequencies for time slot s have been examined. On detecting the completion of channel examination, indicative of the absence of a proper candidate channel of the time slot s, the process returns to step 702. Otherwise, if the examination is not yet completed for all carrier frequencies, step 709 switches the carrier frequency f, and the process returns to step 705. Switching of carrier frequency f at step 709 is of such a cyclic fashion that the frequency is initially at the starting frequency fi which has been selected at random for each time slot, it shifts toward fn in the table of FIG. 4, it next goes to f1, and it shifts toward fi.

Although in the foregoing embodiment, candidate channels are selected sequentially for all time slots, an alternative manner is to specify the range of time slots for the search of candidate channels, e.g., in case the base station has assigned a candidate channel registered in the j-th time slot, another candidate channel is searched only within the j-th time slot in response to another channel assignment request from the mobile station.

Although the foregoing embodiment adopts the FA (first available) scheme which determines a free channel that meets the specified quality and is found first to be a candidate channel for each time slot, an alternative manner is to measure the communication quality of all channels in each time slot and register as a candidate channel a channel of the worst quality among the free channels which meet the specified quality.

Although in the foregoing embodiment, candidate channels, which are selected based on the FA scheme by setting a starting frequency at random for each time slot, are scattered in the channel setup, an alternative manner is to compare the carrier frequency of a newly selected candidate channel with that of already registered candidate channels of other time slots and searches for another candidate channel if the carrier frequencies are too close, thereby equilibrating the channel setup in terms of the carrier frequency.

Figure 8:
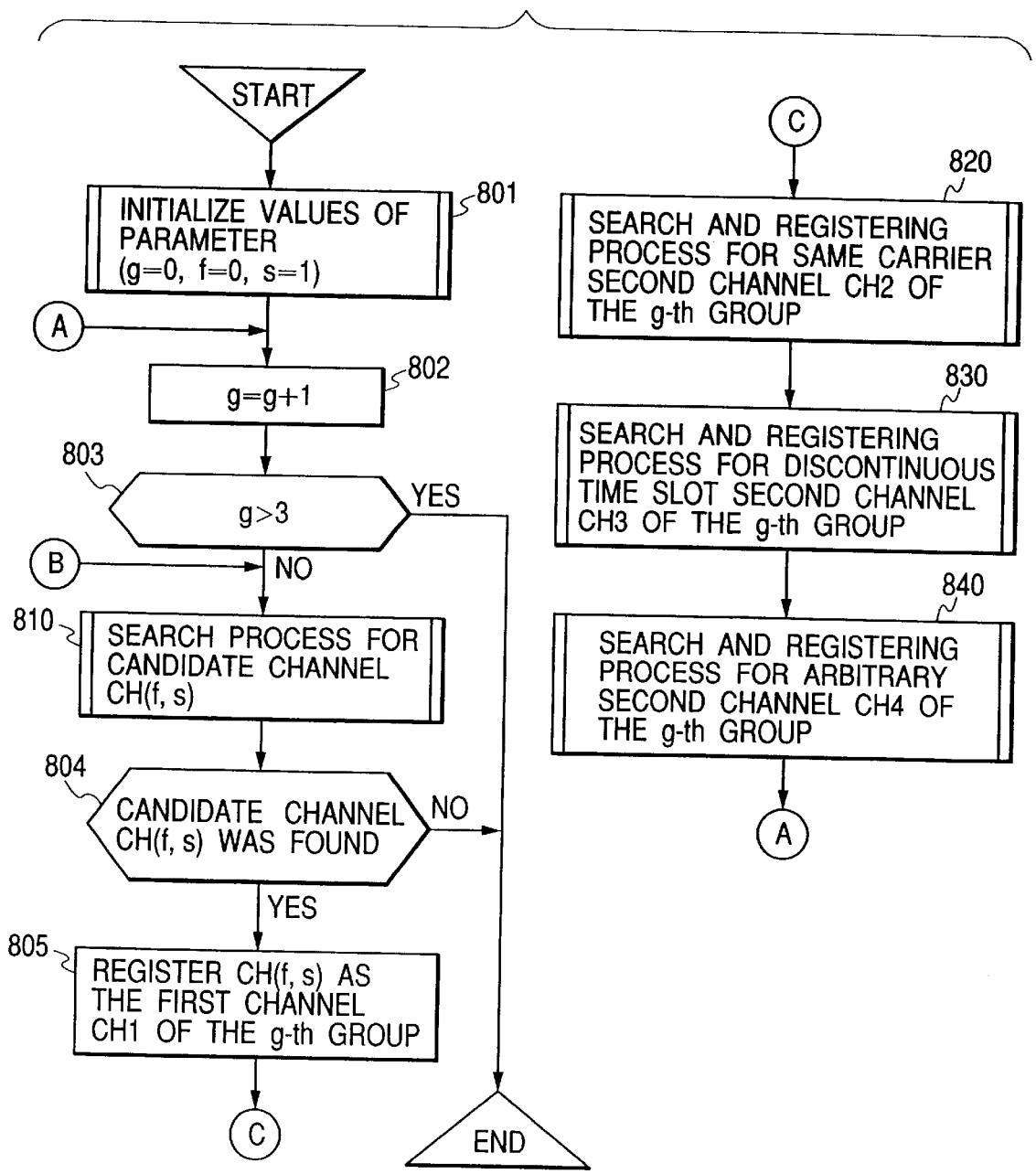
FIG. 8 is a flowchart showing the updating process for the multi-channel management table.

FIG. 8 shows the programmed updating process for the multi-channel management table 400. This process is carried out prior to the updating process for the single-channel management table shown in FIG. 7.

Initially, step 801 initializes the parameter g of the group number, the parameter f of the carrier frequency, and the parameter s of the time slot number. Step 802 increments the group number.

Step 803 checks the resulting value of parameter g. If it exceeds the upper limit, the process terminates. Otherwise, step 810 executes the search routine for finding a candidate channel CH(f, s) which will become the first channel CH1. If no candidate channel is found at step 804, the process terminates.

On finding a candidate channel in the search routine 810, step 805 registers the found candidate channel CH(f, s) as the first channel CH1 of group g. Subsequently, search routines 820,830 and 840 for the second channels CH2, CH3 and CH4 are executed, and the process returns to step 802. Search of candidate channels is repeated for the remaining groups, and the process terminates.

Figure 9:
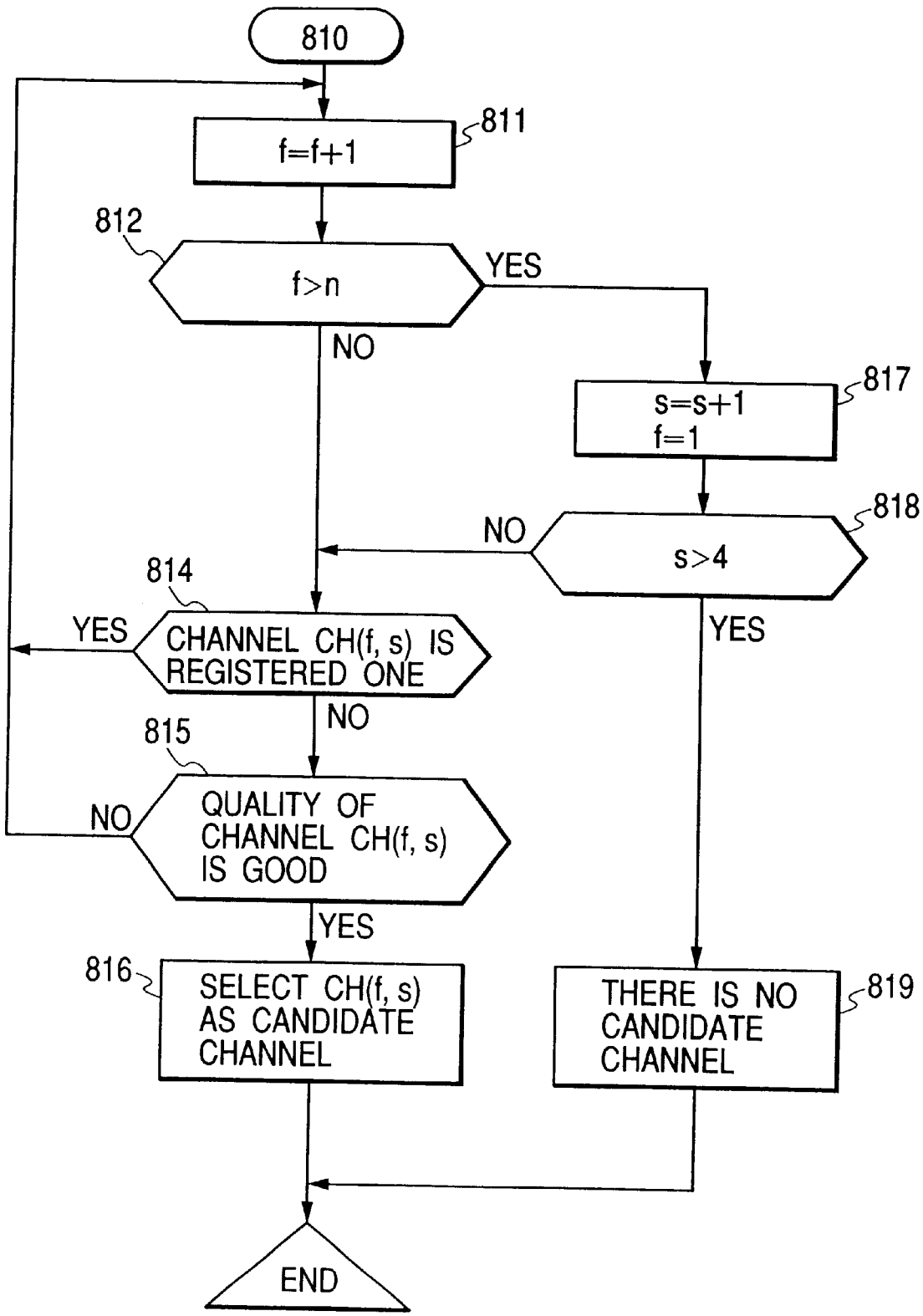
FIG. 9 is a flowchart showing the details of the candidate channel CH(f, s) search routine 810 in FIG. 8.

FIG. 9 shows the details of the candidate channel CH(f, s) search routine 810. The first step 811 increments the parameter f which represents the carrier frequency. Step 812 checks as to whether it exceeds the upper limit value n. Unless the parameter f exceeds the upper limit n, step 814 checks as to whether the candidate channel CH(f, s) is already registered as a candidate channel of other group in the current updating process for the management table 400. If it is found registered already, the process returns to step 811. Otherwise, if the channel CH(f, s) is not registered in the management table 400, step 815 measures the received RF signal of this channel to check as to whether it is a free channel of the specified quality in the same manner as step 706 of FIG. 7.

In case the channel CH(f, s) is proved to be a free channel of the specified quality, step 816 designates it as a candidate channel. The search result flag is set to indicate the presence of candidate channel, and this search routine terminates. Otherwise, if the channel CH(f, s) is denied to be a free channel of the specified quality, the process returns to step 811 to switch the carrier frequency thereby to repeat the examination for the next channel.

When the carrier frequency parameter f exceeds the upper limit value n at step 812, step 817 increments the time slot number s and resets the carrier frequency parameter f to the initial value. Unless the resulting time slot number s exceeds the upper limit, i.e., 4 in this example, at step 818, the process proceeds to the step 814. In case the time slot number s exceeds the upper limit, indicative of the completion of examination for all channels, step 819 resets the search result flag to indicate the absence of candidate channel (end of channel examination), and this search routine terminates. The test step 804 in FIG. 8 discriminates between the presence and absence of a candidate channel based on the search result flag.

Figure 10:
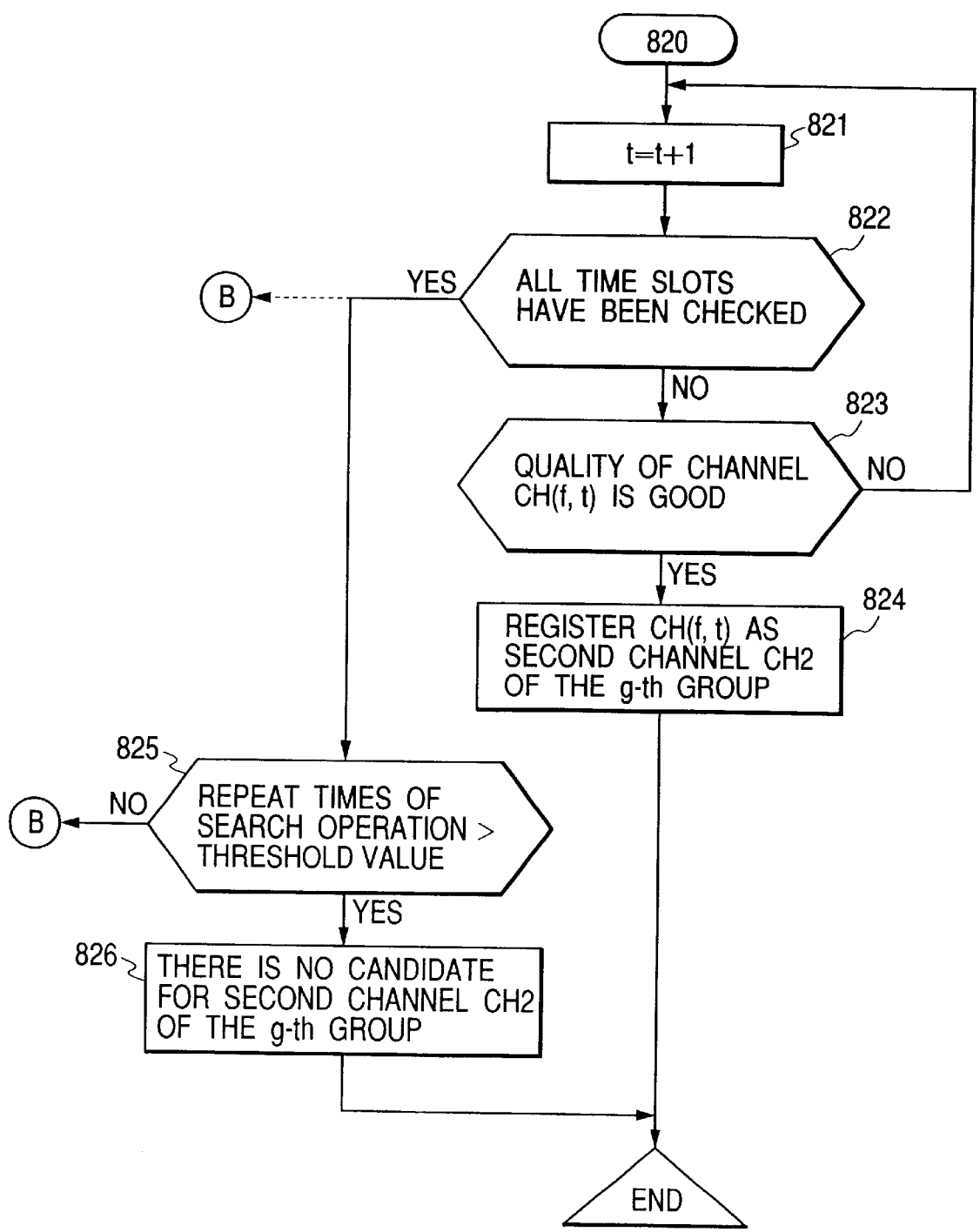
FIG. 10 is a flowchart showing the details of the candidate channel CH2 search routine 820 in FIG. 8.

FIG. 10 shows the details of the second channel CH2 search routine 820. The second channel CH2 is selected on condition that it has the same carrier frequency as of the first channel CH1, but has a different time slot number. Since the time slot number of the first channel CH1 selected by the search routine 810 is indicated by the parameter s, step 821 sets the parameter s to other parameter value t, and thereafter increments the parameter t.

Step 822 checks as to whether the parameter t exceeds the upper limit of time slot number. Unless it exceeds the upper limit, step 823 examines the quality of the channel CH(f, t). If the channel CH(f, t) found to be a free channel of the specified quality, it is registered as second channel CH2 of group g, and the process terminates. Otherwise, if the channel CH(f, t) is not a free channel of the specified quality, the process returns to step 821 to repeat the examination for the next time slot.

In case the parameter t exceeds the upper limit of time slot number at step 822, i.e., when the examination for all time slots completes, the process returns to step 810 in FIG. 8 thereby to retry the search starting at the first channel CH1 of group g. In this case, since the group number g is unvarying, the already registered first channel CH1 of group g is revised to have a newly found channel number. As a manner of preventing the excessive repetition of search of the second channel CH2, it is preferable to count the number of times of return to the step 810 (number of retry of search) so that this search routine is aborted with the conclusion of the absence of second channel CH2 if the count value exceeds a certain threshold.

Figure 11:
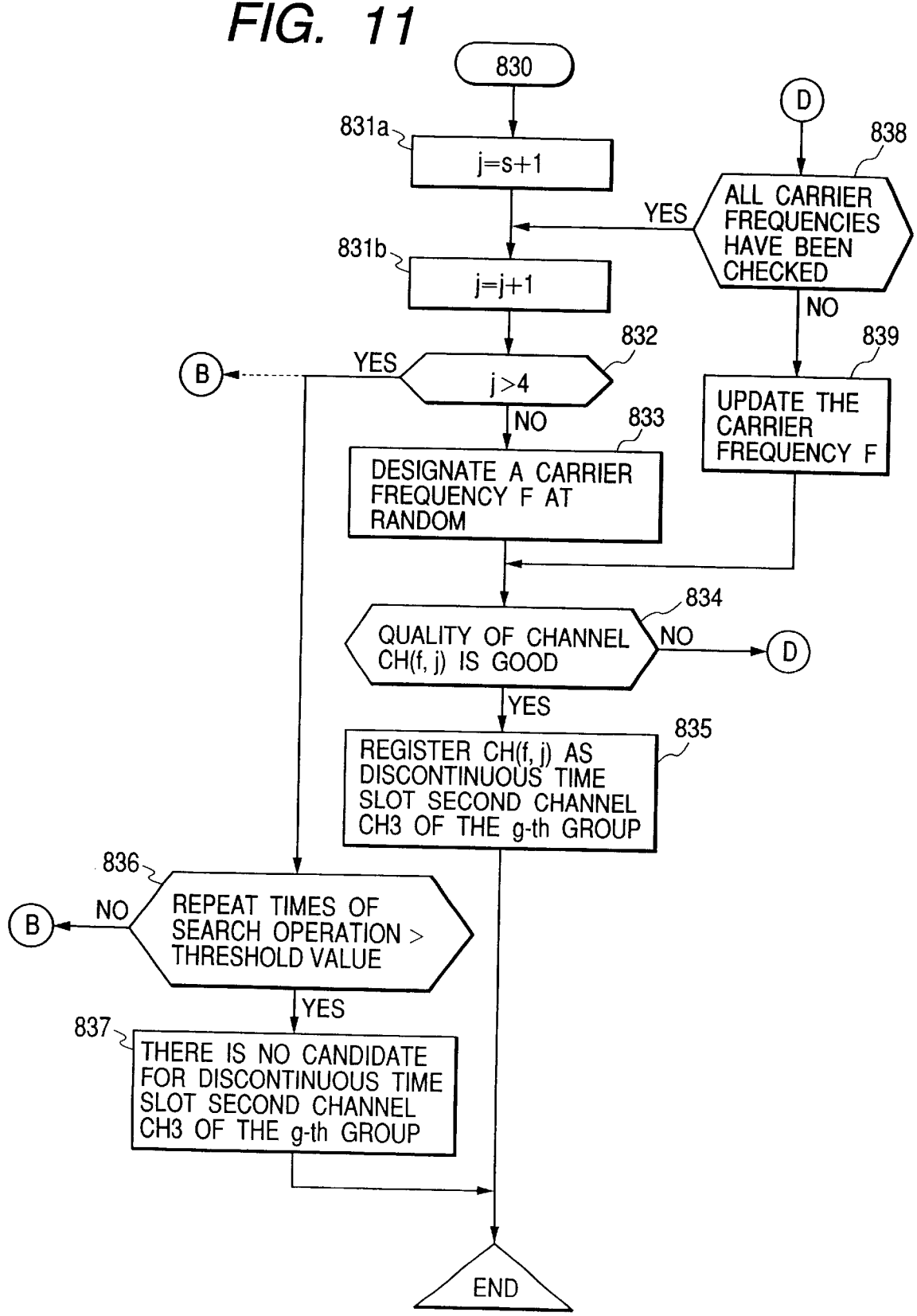
FIG. 11 is a flowchart showing the details of the candidate channel CH3 search routine 830 in FIG. 8.

FIG. 11 shows the details of the second channel CH3 search routine 830. The second channel CH3 is selected on condition that it has a time slot that is discontinuous with that of the first channel CH1. The first step 831a sets the current time slot number s to other value j. Step 832 increments the parameter j. The parameter j represents a time slot that is discontinuous in position with that of the first channel CH1.

When the value of j exceeds 4, indicative of the completion of examination for all time slots, the process returns to the step 810. Otherwise, when the value of j is 4 or less, a carrier frequency F is selected at random, and step 834 examines the channel CH(F, j) in the same manner as the step 706 in FIG. 7.

In case the channel CH(F, j) is a free channel of the specified quality, it is registered as second channel CH3 of group g, and this search routine terminates. Otherwise, if the channel CH(F, j) is not a free channel of the specified quality, step 836 checks as to whether the examination of channel for all carrier frequencies completes. On detecting the completion, the process returns to the step 831b, or otherwise step 837 switches the carrier frequency to proceed to the channel examination of the step 834. As an alternative manner at the end of examination for all time slots, as shown in steps 838, 839, the number of times of return to the step 810 (number of retry of search) is counted, and this search routine is aborted with the conclusion of the absence of second channel CH3 if the count value exceeds a certain threshold, then, the routine proceeds to step 840.

Figure 12:
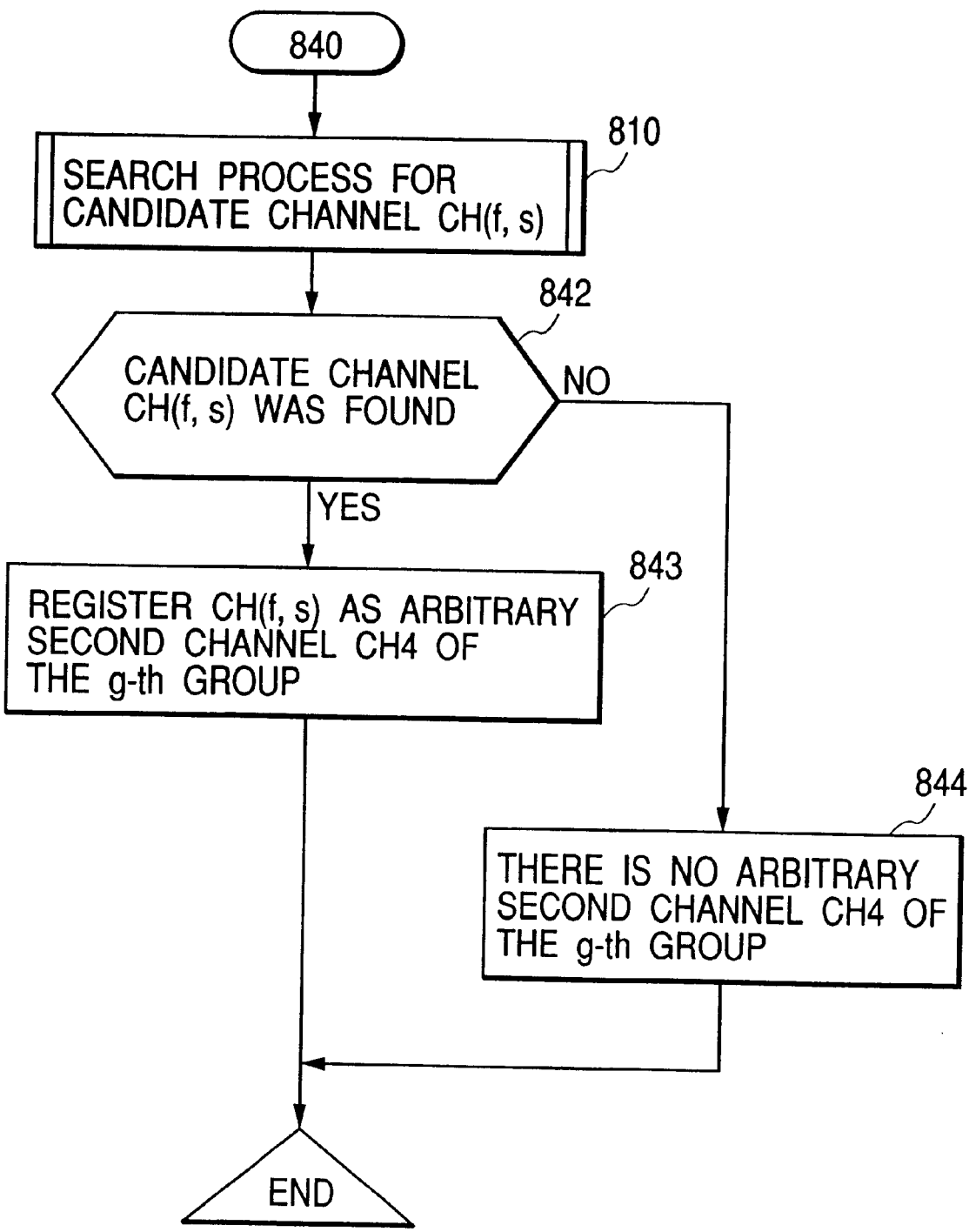
FIG. 12 is a flowchart showing the details of the candidate channel CH4 search routine 840 in FIG. 8.

FIG. 12 shows the details of the second channel CH4 search routine 840. The second channel CH4 is a channel of an arbitrary carrier frequency and time slot. The search routine 810 shown in FIG. 9 is executed to determine the first channel CH1 of group g, and a free channel of the specified quality is searched by starting at the channel next to CH1. Step 842 tests the execution result of search routine 810, and if a candidate channel CH(f, s) is found, it is registered as second channel CH4 of group g. Otherwise, step 844 makes the determination of the absence of second channel CH4, and the search routine 840 terminates, with CH4 being left not registered.

Each base station, when it receives a control message of requesting the channel assignment from a mobile station through the control channel, checks as to whether the requesting mobile station is a single-channel station or multi-channel station based on the control information included in the control message, and implements the channel assignment operation by making reference to the single-channel management table 300 in the case of a single-channel mobile station or the multi-channel management table 400 in the case of a multi-channel mobile station.

Figure 13:
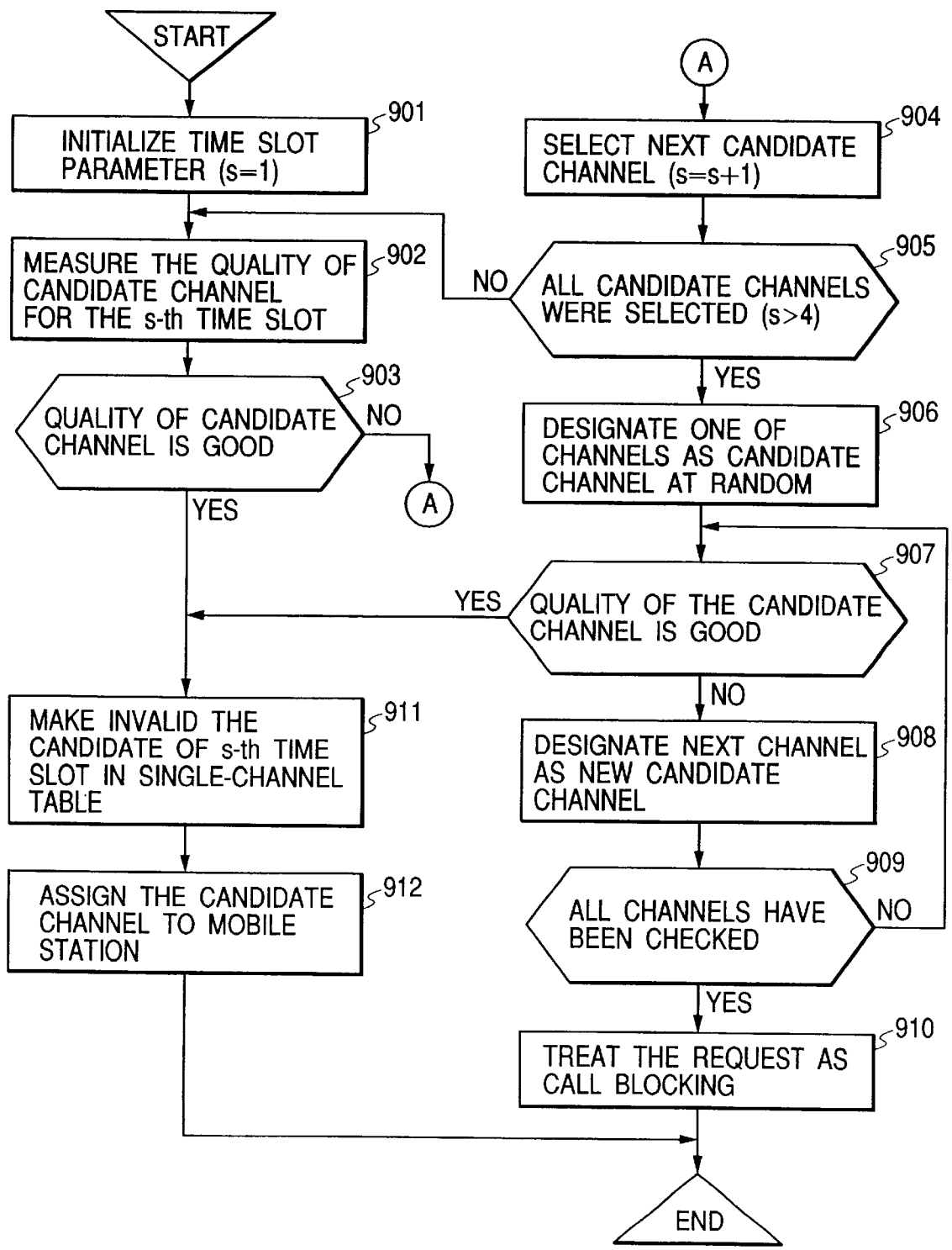
FIG. 13 is a flowchart of the channel assignment process for single-channel communication.

FIG. 13 shows the programmed process of channel assignment to a single-channel mobile station. The first step 901 initializes the parameter s of the time slot number to 1. Step 902 measures the communication quality of a candidate channel which is registered for time slot s in the management table 300. Specifically, the base station calls on the mobile station through the control channel to send a dummy signal through the candidate channel and measures the reception quality in terms of CIR (carrier to interference power ratio), CNR (carrier to noise power ratio), BER (bit error rate), etc. in the conventional manner.

In case the candidate channel meets the specified quality, step 911 removes the candidate channel from the single-channel management table 300, and step 912 assigns the candidate channel to the mobile station. Otherwise, if the candidate channel does not meet the specified quality, step 904 advances the slot number s, and step 905 checks as to whether candidate channels have been selected for all time slots. Unless channel selection completes, the process returns to step 902. On detecting the completion of channel selection, step 906 selects at random a new candidate channel from among all channels shown in FIG. 4.

Step 907 checks the communication quality of the new candidate channel in the same manner as the steps 902 and 903. In case the new candidate channel meets the specified quality, the process proceeds to step 911, or otherwise step 908 designates the next channel for the new candidate channel sequentially, thereby repeating the quality determination of step 907. In this case, the step 907 skips the candidate channel that is already registered in the management table 300 and the candidate channel for multi-channel communication registered in the management table 400. If all channels are detected to have been already examined at step 909, the channel assignment operation for the requesting mobile station is aborted, and the channel assignment request is treated to end in call blocking.

Although in the foregoing embodiment, the registered candidate channels of TS1–TS4 are examined for their communication quality in the order of time slot number in the management table 300 based on the initialization of time slot number s to 1, an alternative manner is to set the initial value of the time slot number at random so that the channel assignment takes place in an irregular order of time slot. In addition, the starting time slot number may be altered at each event of channel assignment request so that the candidate channel stays at a discontinuous time slot position in the management table 300 after the channel assignment.

Figure 14:
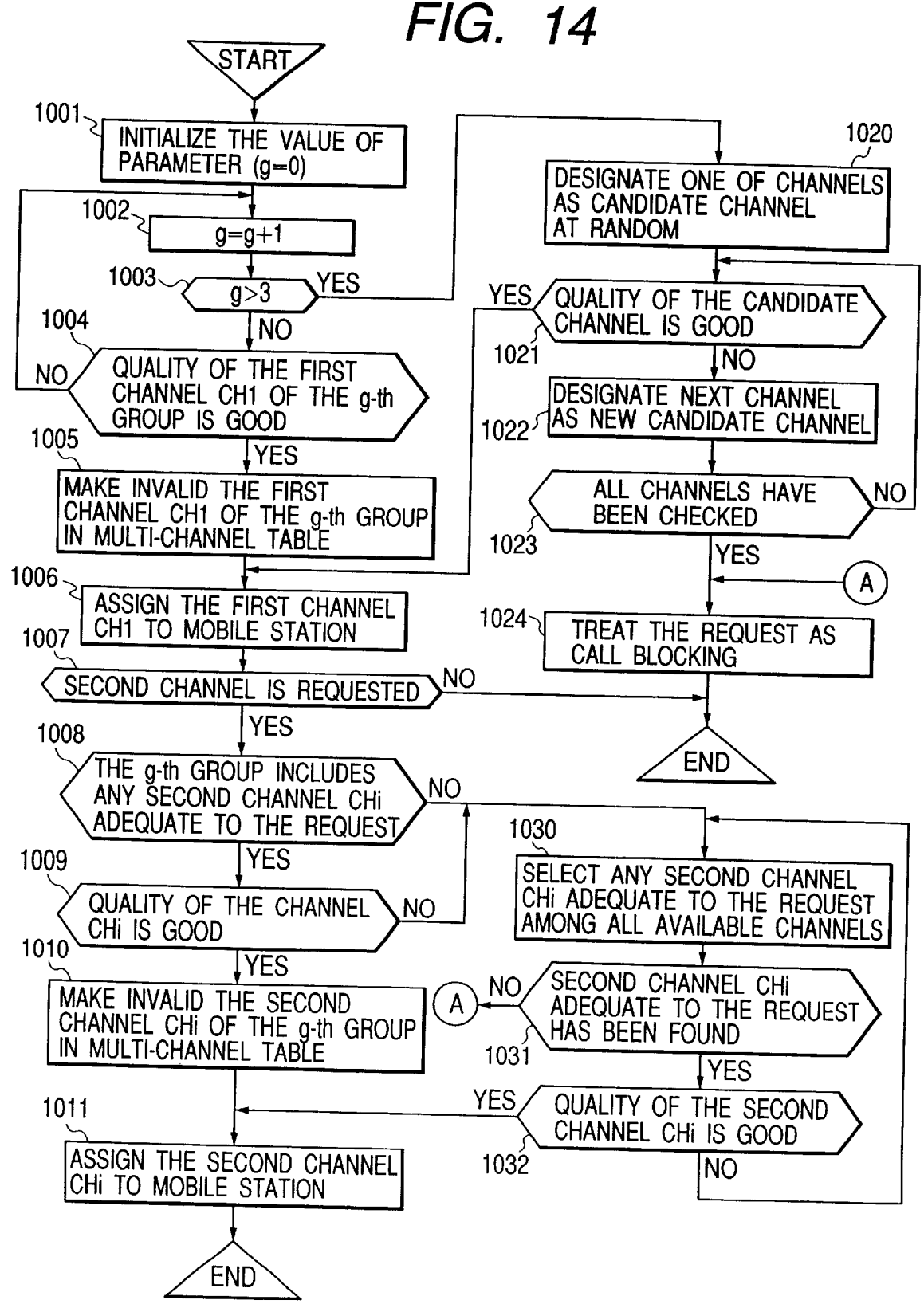
FIG. 14 is a flowchart of the channel assignment process for 2-channel communication.

FIG. 14 shows the programmed process of channel assignment to a multi-channel mobile station. The first step 1001 initializes the parameter g of the group number of the multi-channel management table 400 to 0. The next step 1002 increments the parameter g. Step 1003 compares the resulting parameter value with the upper limit value (3 in this example). Unless it exceeds the upper limit, step 1004 examines the communication quality of the first channel CH1 of group g in the management table 400 in the same manner as the steps 902 and 903 in FIG. 14. Unless the specified quality is met, the process returns to the step 1002 to repeat the operation for the next group number. In case the quality of the first channel CH1 of group g meets the specified quality, step 1005 removes (invalidates) the channel CH1 from the management table 400, and step 1006 assigns it to the requesting mobile station.

In case the group number g exceeds the upper limit at step 1003, indicating that all of the first candidate channels CH1 registered in the management table 400 are improper for the assignment to the currently attended mobile station, the process proceeds to step 1020 to select a first channel CH1 to be assigned to the mobile station from among all channels shown in FIG. 4. Namely, after the random selection of a candidate channel at step 1020, the next step 1021 checks as to whether it meets the specified quality.

If the candidate channel meets the specified quality, the process proceeds to step 1006 to assign the candidate channel to the mobile station. Otherwise, if it does not meet the condition, step 1022 selects the candidate channel of the next channel number and returns it to the preceding step 1021, which then examines the communication quality. If the examination completes for all channels without finding a candidate channel that meets the specified quality, the channel assignment request is treated to end in call blocking by steps 1023 and 1024, and this channel assignment process terminates.

Following the assignment of the first channel CH1 to the mobile station at step 1006, the next step 1007 checks the presence or absence of a request of second channel assignment from the mobile station. If there is no assignment request for a second channel, this channel assignment process terminates.

In case the mobile station requests the assignment of a second channel, step 1008 tests as to whether a second channel CHi (CH1, CH2 or CH3) that meets the requirement is resident in group g of the management table 400. If a relevant second channel CHi is resident, step 1009 examines the communication quality of the channel, and, if the specified quality is met, step 1010 removes (invalidates) the channel CHi from the management table 400 and step 1011 assigns it to the mobile station. Then, this channel assignment process terminates. Otherwise, if no second channel CHi which meets the requirement is resident for group g of the management table 400, or if a second channel CHi that meets the requirement does not meet the specified quality, the process proceeds to step 1030, which selects other second channel CHi that meets the requirement from among the channels shown in FIG. 4 in the same manner as the routine 820, 830 or 840 explained previously.

In case other second channel CHi that meets the requirement is not found, the process proceeds to step 1024, at which the channel assignment request is treated to end in call blocking. Otherwise, if other second channel CHi is found, step 1032 examines its communication quality, and, if the specified quality is met, the process proceeds to step 1011 which assigns the second channel CHi to the mobile station. If the second channel CHi does not meet the specified quality, the process returns to the step 1030 to retry the search for other CHi.

According to the foregoing embodiment, in which multiple groups of candidate channels which meet individual requirements of multi-channel communication are registered in advance in the multi-channel management table 400, it is possible for the base station which receives a channel assignment request from a mobile station to implement the channel assignment quickly by making reference the management table 400. In addition, by selecting multiple groups of candidate channels for the conditional multi-channel communication in advance in precedence over the channel selection for single-channel communication and saving the channel groups in the multi-channel management table 400, it becomes possible to reduce the occurrence of call blocking of multi-channel communication.

The following explains some variant embodiments of this invention.

In a first variant embodiment, when a mobile station of multi-channel type begins the communication through a single channel, the assigned channel is switched amid the communication to a traffic channel which is registered in the single-channel management table.

After the base station 104 has assigned a first channel CH1 registered in the multi-channel management table 400 to a mobile station, when it receives a call set-up request before receiving the assignment request of a second channel CHi, it establishes a communication link between the mobile station and the called station by way of the switching node 106. In this case, the traffic channel CHi assigned to the mobile station meets a special condition for multi-channel communication and it is too good to be used for single-channel communication. On this account, the base station lowers the level of RF transmission signal to the mobile station on the traffic channel CH1 with the intention of letting the mobile station release the traffic channel CHi. The mobile station detects the resulting deteriorated quality of the channel CHi and requests the base station to change the channel.

In response to the channel alteration request, the base station runs the channel assignment program for single-channel communication shown in FIG. 13 to select a channel which replaces the channel CH1 from among the candidate channels registered in the single-channel management table 300. The freed channel CH1 is restored to the multi-channel management table 400 in the next updating process and will be used at a channel assignment request from a multi-channel mobile station.

The above-mentioned channel switching based on the intentional reduction of the transmission RF signal level is also applicable to single-channel mobile stations. Specifically, if no channel to be assigned is found for a channel assignment request from a single-channel mobile station, the channel assignment process shown in FIG. 13 treats the request to end in call blocking at step 910. If, in this case, the multi-channel assignment process shown in FIG. 14 is implemented in place of the step 910, the traffic channel CH1 selected from among candidate channels registered in the multi-channel management table 400 can be assigned to the single-channel mobile station. In this case, the second channel CH4 may be assigned to the mobile station, instead of the channel CH1 so that it is spared for multi-channel communication.

Alternatively, the first channel CH1 is assigned for single-channel communication only temporarily and its quality is forced to deteriorate at the end of communication of other mobile station or at the time when a channel for single-channel communication becomes available due to hand over or the like, so that it is restored to the multi-channel management table 400 in the same manner as the process explained previously. Accordingly, by providing a candidate channel, which is registered for multi-channel communication, temporarily for single-channel communication, it becomes possible to prevent the call blocking of single-channel mobile stations.

Figure 15:
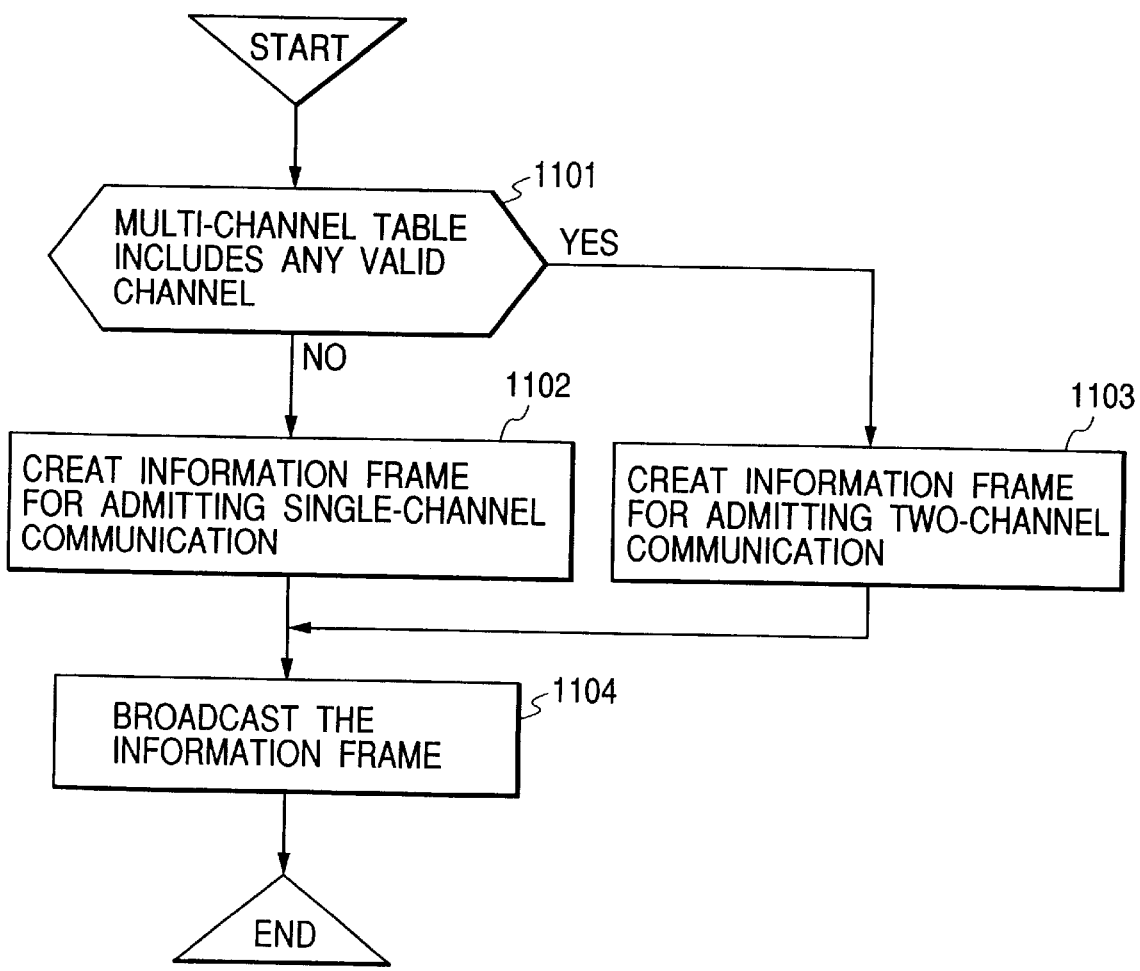
FIG. 15 is a flowchart showing an example of the transmission process of the base station.

FIG. 15 shows by flowchart, as a second variant embodiment of this invention, an example of the programmed process implemented by a base station for suppressing requests of multi-channel assignment from mobile stations.

Step 1101 checks as to whether effective candidate channels CH1 are left in the multi-channel management table 400. In case there exists any effective candidate channel, step 1103 generates a first information frame indicative of the granting a multi-channel assignment request, or otherwise step 1102 generates a second information frame indicative of the granting of only a single-channel assignment request. Step 1104 sends selected information frames periodically.

The first and second information frames are transmitted by each base station periodically through a notification channel (a kind of control channel) which is used for providing the mobile stations located within the cell of the base station with information of channel configuration, base station identifier, and the like.

Switching from the first information frame to the second information frame may take place before the candidate channels CH1 in the multi-channel management table 400 are used up. For example, the first information frame is switched to the second information frame when the number of remaining candidate channels CH1 for multi-channel communication becomes one, and the second information frame is switched back to the first information frame thereby to cancel the suppression of multi-channel assignment when two or more number of candidate channel groups are stored in the management table 400 at the end of communication or as a result of release of assigned channels due to hand over or the like.

Based on the suppression of channel assignment requests from mobile stations by broadcasting the situation of free channels on the part of base stations to all mobile stations, the occurrence of call blocking due to the shortage of free channels can be prevented and the overhead channel assignment process of the base stations can be reduced.

Figure 16:
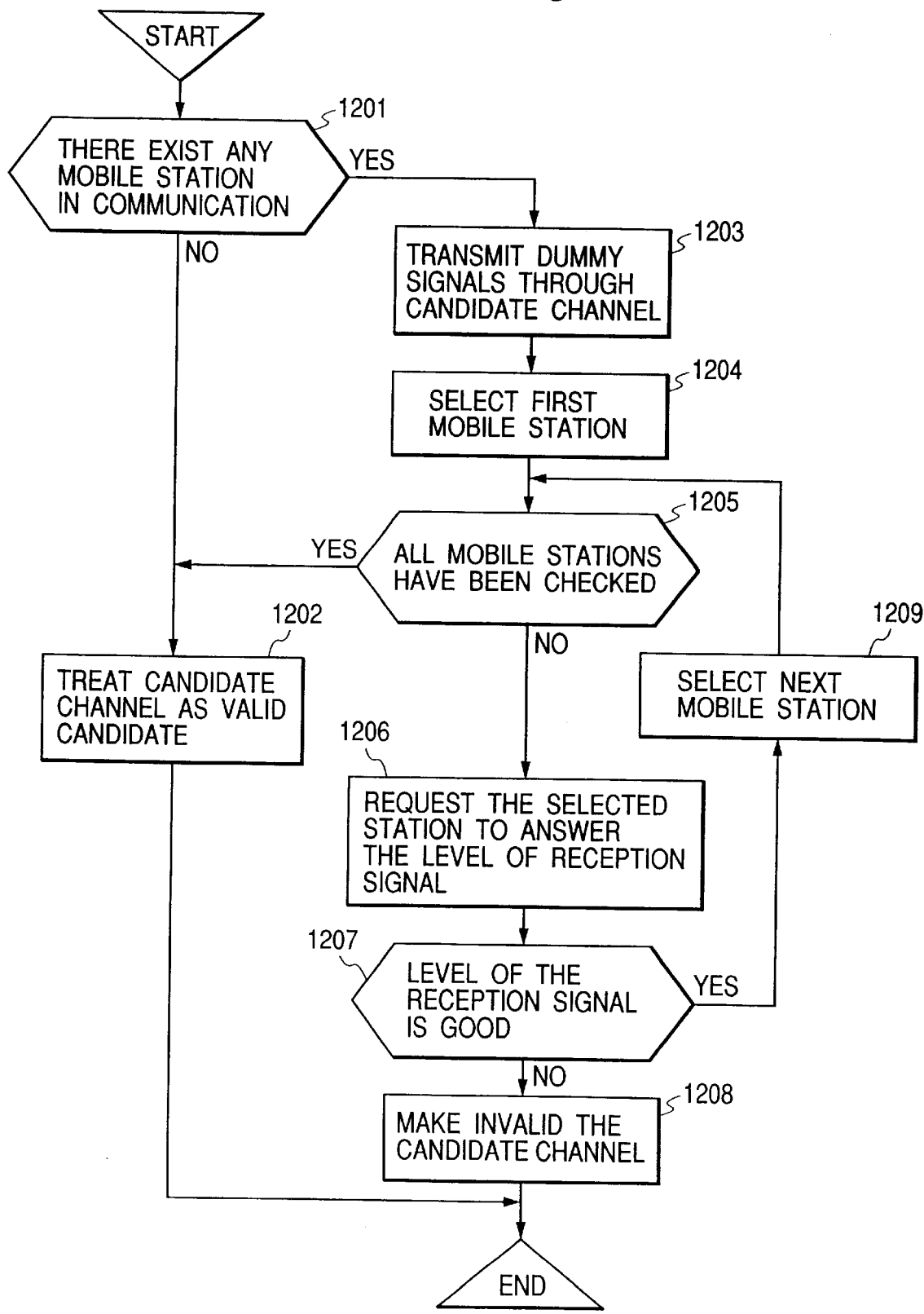
FIG. 16 is a flowchart showing the candidate channel selecting process based on another embodiment of this invention.

FIG. 16 shows by flowchart, as a third variant embodiment of this invention, a determination routine for selecting candidate channels to be registered in the management tables 300 and 400 more strictly.

In contrast to the management table updating process explained in connection with FIG. 7 and FIG. 8 through FIG. 12, in which if a channel under test has its RF reception level being below a certain level, it is identified to be a free channel of the specified quality and registered as a candidate channel in the management table 300 or 400, the variant determination routine of FIG. 16 is designed to examine the influence of each candidate channel selected based on the RF reception level on other active traffic channels. This determination routine is inserted, for example, between step 706 and step 707 of the single-channel management table updating program shown in FIG. 7, and the subsequent candidate channel selecting step is executed in case the determination routine identifies the candidate channel to be invalid. The determination routine is inserted similarly in the multi-channel management table updating program at the position immediately preceding the step 805 in FIG. 8, step 816 in FIG. 9, step 824 in FIG. 10, step 835 in FIG. 11, and step 843 in FIG. 12.

In FIG. 16, step 1201 checks the presence or absence of mobile stations which are amid communication with the base station. If there is no communicating mobile stations, step 1202 identifies the candidate channel to be valid, and the process terminates. Otherwise, if there are communicating mobile stations, step 1203 transmits dummy signals through the candidate channel and selects the first of the communicating mobile stations.

The next step 1205 checks as to whether the examination of all communicating mobile stations completes. On detecting the completion, the process proceeds to step 1202, or otherwise step 1206 directs the selected mobile station through the control channel to report the reception signal level of the channel in use. Step 1207 compares the reported reception signal level with the threshold. If the signal level is above the threshold, step 1209 selects the next mobile station, and the process returns to step 1205. Otherwise, in case the signal level is below the threshold, indicative of the adverse influence of the use of the candidate channel on the communication of other channels, step 1208 invalidates the candidate channel.

According to the foregoing variant embodiment, in which candidate channels having the adverse influence on the communication of other channels are removed, it is possible to ensure the communication quality of already assigned traffic channels and prevent the switching of channel or suspension of communication due to the deterioration of communication quality.

As an alternative scheme of the assessment of the degree of influence on other channels, mobile stations, with channels being already assigned thereto, are directed to report the reception signal level of their channels, and the threshold used in step 1207 is determined for each mobile station based on the reported signal level. Alternatively, the degree of influence on other channels may be assessed based on other quality information instead of the reception signal level mentioned above.

Validation of the candidate channel may be conducted based on the use of other mobile station which is not amid communication currently. For example, the base station sends a dummy signal to the candidate channel and directs a mobile station, which is located within the cell area and is not amid communication currently, through the control channel to measure the communication quality of the candidate channel. On receiving the measurement request, the mobile station measures the communication quality based on the CIR, CNR, BER, etc. for the dummy signal received through the candidate channel, and reports the measurement result to the base station through the control channel. The base station determines the validity of the candidate channel based on the measurement result provided by the mobile station through the control channel.

Alternatively, the base station directs a mobile station, which is not amid communication currently, through the control channel to transmit a dummy signal over the candidate channel, and measures the communication quality by itself based on the CIR, CNR, BER, etc. thereby to determine the validity of the candidate channel.

Alternatively, the base station issues quality measurement requests for a same candidate channel to multiple mobile stations. These mobile stations measure the dummy signal which is transmitted through one candidate channel, and the base station collects the quality measurement results provided by the mobile stations and determines the validity of the candidate channel based on the worst communication quality.

According to the present invention as described above, in which candidates of traffic channels to be assigned to multi-channel mobile stations are saved in the management table in advance, it is possible for base stations to respond to channel assignment requests from mobile stations quickly. In addition, by saving candidate channels, which meet required conditions of multi-channel mobile stations, in the management table in advance, it becomes possible to reduce the occurrence of call blocking due to the shortage of free channels.

Although in the foregoing embodiment, two traffic channels, i.e., first and second, are assigned to a multi-channel mobile station, the present invention is also applicable to the assignment of three or more traffic channels to one mobile station.

What is claimed is:

1. A base station for a multi-carrier TDMA radio communication system which uses a plurality of carrier frequencies each having time-division multiplex time slots, said base station comprising:

a management table memory for registering therein at least one group of candidate channels for multi-channel communication selected from among free traffic channels each defined in terms of the carrier frequency and time slot number, said candidate channel group comprising a plurality of candidate traffic channels classified into a predetermined number of sub-groups corresponding to the type of multi-channel communication, each of said sub-groups including candidate traffic channels having a predetermined mutual relation with respect to at least one of the carrier frequency and time slot; and a channel assigning unit which, in response to the reception of a channel assignment request from a mobile station of multi-channel type that uses multiple channels, retrieves traffic channels to be assigned to said mobile station from one of said sub-groups by making reference to said management table memory according to the type of multi-channel communication specified by the channel assignment request.

2. A base station according to claim 1, wherein each of said sub-groups registered in said management table memory comprises a first candidate channel and at least one second candidate channel having a predetermined mutual relation with said first candidate channel in regard to the channel arrangement in terms of the carrier frequency and time slot number, and wherein said channel assigning unit includes means for selecting traffic channels that are suited for said mobile station from among the candidate channels registered in one of said sub-groups.

3. A base station according to claim 2, wherein said channel assigning unit includes means for measuring, in cooperation with said requesting mobile station, the communication quality of the candidate channels specified in one of said sub-groups.

4. A base station according to claim 3, wherein said channel assigning unit includes means for searching for, when candidate channels that meet the specified communication quality for said mobile station are absent in said management table memory, channels that meet the specified communication quality for said mobile station from among other free traffic channels which are not registered in said management table memory.

5. A base station for a multi-carrier TDMA radio communication system which uses multiple carrier frequencies each having time-division multiplex time slots, said base station comprising:

a first management table for registering therein at least one candidate channel for single-channel communication selected from among a plurality of free traffic channels each defined in terms of the carrier frequency and time slot number;

a second management table for registering therein at least one group of candidate channels for multi-channel communication selected from among said free traffic channels, said candidate channel group comprising a plurality of candidate traffic channels classified into a predetermined number of sub-groups corresponding to the type of multi-channel communication, each of said sub-groups including candidate traffic channels having a predetermined mutual relation with respect to at least one of the carrier frequency and time slot; and a channel assigning unit which, in response to the reception of a channel assignment request from a mobile station, retrieves at least one traffic channel to be assigned to said mobile station by making reference to one of said first and second management tables depending on the type of said requesting mobile station, wherein said channel assigning unit retrieves traffic channels to be assigned to a mobile station of multi-channel type from one of said sub-groups by making reference to said second management table memory according to the type of multi-channel communication specified by the channel assignment request.

6. A base station according to claim 5, wherein each of said sub-groups registered in said second management table comprises a first candidate channel and at least one second candidate channel having a predetermined mutual relation with said first candidate channel in regard to the channel arrangement in terms of the carrier frequency and time slot number, and wherein said channel assigning unit includes means for selecting, in response to the reception of the reception of a channel assignment request from a mobile station of multi-channel type, traffic channels that are suited for said mobile station of multi-channel type from among the candidate channels registered in one of said sub-groups.

7. A base station according to claim 6, wherein said channel assigning unit includes means for measuring, in cooperation with said requesting mobile station, the communication quality of the candidate channel selected in said first or second management table.

8. A base station according to claim 7, wherein said channel assigning unit includes means for searching for, if candidate channels that meet the specified communication quality for said mobile station are absent in said first or second management table, at least one channel that meets the specified communication quality for said mobile station among other free traffic channels which are not registered in said first or second management table.

9. A method of traffic channel assignment for a multi-carrier TDMA radio communications system which conducts a communication between a base station and a mobile station by using selectively at least one of a plurality of carrier frequencies and at least one of multiple time slots which are time-division multiplexed with each of the carrier frequencies, said method comprising the steps of:

registering in a management table memory at least one group of candidate channels for multi-channel communication selected from among a plurality of traffic channels each defined in terms of the carrier frequency and time slot number, said candidate channel group comprising a plurality of candidate traffic channels classified into a predetermined number of sub-groups corresponding to the type of multi-channel communication, each of said sub-groups including candidate channels having a predetermined mutual relation with respect to at least one of the carrier frequency and time slot; and assigning to said mobile station, in response to the reception of a channel assignment request from a mobile station of multi-channel type that uses multiple channels, traffic channels retrieved from one of said sub-groups by making reference to said management table in memory according to the type of multi-channel communication specified by the channel assignment request.

10. A traffic channel assigning method according to claim 9, wherein said candidate channel registering step selects as candidate channels of each of said sub-groups a first candidate channel and at least one second candidate channel having a predetermined mutual relation with said first candidate channel in regard to the channel arrangement in terms of the carrier frequency and time slot number.

11. A method of traffic channel assignment for a multi-carrier TDMA radio communication system which conducts communication between a base station and a mobile station by using selectively at least one of carrier frequencies and at least one of multiple time slots which are time-division multiplexed with each of the carrier frequencies, said method comprising the steps of:

registering in a first management table at least one candidate channel for single-channel communication selected from among free traffic channels each defined in terms of the carrier frequency and time slot number;

registering in a second management table at least one group of candidate channels for multi-channel communication selected from among said traffic channels, said candidate channel group comprising a plurality of candidate traffic channels classified into a predetermined number of sub-groups corresponding to the type of multi-channel communication, each of said subgroups including candidate traffic channels having a predetermined mutual relation with respect to at least one of the carrier frequency and time slot; and assigning, in response to the reception of a channel assignment request from a mobile station, at least one traffic channel to said mobile station by making reference to one of said first and second management tables depending on the type of said requesting mobile station.

12. A traffic channel assigning method according to claim 11, wherein said candidate channel registering step for said second management table selects as candidate channels of each of said sub-groups for multi-channel communication a first candidate channel and at least one second candidate channel having a predetermined mutual relation with said first candidate channel in regard to the channel arrangement in terms of the carrier frequency and time slot number, and said channel assigning step selects, in response to the reception of a channel assignment request from a mobile station of multi-channel type that uses multiple channels, multiple channels having a mutual relation suitable for said requesting mobile station of multi-channel type from among candidate channels of one of said sub-groups registered in said second management table.

* * * * *